United States Patent
Shoemake

(10) Patent No.: US 7,593,478 B2
(45) Date of Patent: Sep. 22, 2009

(54) LOW PEAK TO AVERAGE RATIO SEARCH ALGORITHM

(75) Inventor: Matthew B. Shoemake, Allen, TX (US)

(73) Assignee: QUALCOMM Incorporated, San Diego, CA (US)

( * ) Notice: Subject to any disclaimer, the term of this patent is extended or adjusted under 35 U.S.C. 154(b) by 891 days.

(21) Appl. No.: 11/114,355

(22) Filed: Apr. 25, 2005

(65) Prior Publication Data

US 2005/0237921 A1 Oct. 27, 2005

Related U.S. Application Data

(60) Provisional application No. 60/565,338, filed on Apr. 26, 2004.

(51) Int. Cl.
*H04L 27/00* (2006.01)
*H04K 1/02* (2006.01)

(52) U.S. Cl. ........................ 375/296; 375/295; 375/297; 707/1

(58) Field of Classification Search ................. 375/295, 375/296, 316, 224, 297; 707/1
See application file for complete search history.

(56) References Cited

U.S. PATENT DOCUMENTS

| | | | | |
|---|---|---|---|---|
| 7,010,028 | B2 * | 3/2006 | Carlson | 375/222 |
| 7,103,097 | B1 * | 9/2006 | Duvaut et al. | 375/222 |
| 7,236,533 | B2 * | 6/2007 | Chu et al. | 375/260 |
| 7,257,094 | B2 * | 8/2007 | Shoemake | 370/311 |
| 7,292,639 | B1 * | 11/2007 | Demirekler et al. | 375/260 |
| 7,318,185 | B2 * | 1/2008 | Khandani et al. | 714/758 |
| 7,409,009 | B2 * | 8/2008 | Akhtman | 375/296 |
| 2001/0022777 | A1 * | 9/2001 | Bourget et al. | 370/210 |
| 2002/0105925 | A1 * | 8/2002 | Shoemake | 370/330 |
| 2002/0168016 | A1 * | 11/2002 | Wang et al. | 375/260 |
| 2003/0050906 | A1 * | 3/2003 | Clifton-Bligh | 707/1 |
| 2003/0120630 | A1 * | 6/2003 | Tunkelang | 707/1 |
| 2004/0136315 | A1 * | 7/2004 | Chang | 370/206 |
| 2004/0146115 | A1 * | 7/2004 | Feng et al. | 375/260 |
| 2004/0179468 | A1 * | 9/2004 | Jaenecke et al. | 370/203 |
| 2004/0193566 | A1 * | 9/2004 | Kothuri | 707/1 |
| 2004/0218689 | A1 * | 11/2004 | Akhtman | 375/296 |
| 2004/0234006 | A1 * | 11/2004 | Leung | 375/316 |

(Continued)

OTHER PUBLICATIONS

Vengatachalam et al., "OFDM: An Overview". The Eighth National Conference on Communications, Jan. 26-27, 2002. Session A6—Communication System III, Jan. 27, 2002. URL: www.ee.iitb.ac.in/uma/~ncc2002/proc/NCC-2002/pdf/n042.pdf.

(Continued)

*Primary Examiner*—Jason M. Perilla
(74) *Attorney, Agent, or Firm*—Dang M. Vo

(57) ABSTRACT

The present invention provides a method for selecting channel estimation sequences with low Peak to Average Ratios (PAR) for Orthogonal Frequency Division Multiplexing (OFDM) signals. The method involves selecting a channel estimation sequence and random and then searching all sequences within a defined neighborhood (distance) of that sequence. If any of the sequences in the neighborhood have a PAR lower than the seed sequence, that new neighborhood sequence becomes the new seed, and the algorithm now searches all sequences within a defined distance of the new seed to determine if any of them have a lower PAR. This process is repeated until the process converges on the sequence with the lowest PAR.

17 Claims, 5 Drawing Sheets

U.S. PATENT DOCUMENTS

2005/0089116 A1* 4/2005 Moffatt et al. .............. 375/295

OTHER PUBLICATIONS

Proakis et al., "Multicarrier Modulation and OFDM", National Instruments Corporation, URL: www.zone.ni.com, pp. 1-5. Retrieved: Apr. 19, 2005.

"What is MATLAB", Matlab Guide, URL: www.phys.ufl.edu/~flliu/comp/matlab.html, pp. 1-10. Retrieved: Apr. 19, 2005.

"Accessing MATLAB", Matlab Primer (1), URL: robotics.caltech.edu/~jwb/courses/ME70/matlab-primer1.html, pp. 1-7. Retrieved: Apr. 19, 2005.

"Matlab (tm) Quick Reference", URL: web.usana.navy.mil/~mecheng/DESIGN/CAD/MATLAB/matlab/matlab.html., pp. 1-5. Retrieved: Apr. 19, 2005.

"ifft (MATLAB Function Reference)", URL: www.phys.ufl.edu/docs/matlab/techdoc/ref/ifft.html. pp. 1-1. Retrieved: Apr. 19, 2005.

IEEE 802.15.3, "Part 15.3: Wireless Medium Access Control (MAC) and Physical Layer (PHY) Specifications for High Rate Wireless Personal Area Networks (WPANs)," IEEE Computer Society, 2003.

Weinstein et al., "Data Transmission by Frequency-Division Multiplexing Using the Discrete Fourier Transform", IEEE Transactions on Communication Technology, vol. Com-19, No. 5, Oct. 1971, pp. 628-634.

Vengatachalam et al., "OFDM: An Overview", 2007.

Litwin et al., "The Principles of OFDM", RF Signal Processing, www.rfdesign.com, Jan. 2001, pp. 30-48.

Proakis et al., "Multicarrier Modulation and OFDM", National Instruments, www.zone.ni.com, pp. 1-5, 2005.

"What is MATLAB", Matlab Guide, www.phys.ufl.edu/~rlliu/comp/matlab.html, pp. 1-10, 2005.

"Accessing MATLAB", Matlab Primer (1), robotics.caltech.edu/~jwb/courses/ME70/matlab-primer1.html, pp. 1-7, 2005.

"Matlab (tm) Quick Reference", web.usana.navy.mil/~mecheng/DESIGN/CAD/MATLAB/matlab/matlab.html., pp. 1-5, 2005.

"MATLAB Function Reference ifft", www.phys.ufl.edu/docs/matlab/techdoc/ref/ifft.html, 2005.

* cited by examiner

LOW PEAK TO AVERAGE RATIO SEARCH ALGORITHM

CROSS-REFERENCE TO RELATED APPLICATIONS

This application claims the benefit of and priority to U.S. Provisional Patent Application No. 60/565,338 filed Apr. 26, 2004 the technical disclosures of which are hereby incorporated herein by reference.

TECHNICAL FIELD

The present invention relates generally to wireless communications systems, such as a multi-band OFDM (Orthogonal Frequency Division Multiplexing) UWB (Ultra Wide Band) communication system. More particularly, the present relates to a manner by which to form a deterministic sequence for use, e.g., as a channel estimation sequence.

BACKGROUND OF THE INVENTION

In a conventional serial data system, symbols are transmitted sequentially, with the frequency spectrum of each data symbol allowed to occupy the entire bandwidth. A parallel data transmission system is one in which several sequential streams of data are transmitted simultaneously. In a parallel system, the spectrum of an individual data element normally occupies only a small part of the available bandwidth.

In a classic parallel data system, the total signal frequency band is divided into N overlapping frequency subchannels. Each subchannel is modulated with a separate symbol. The subchannels are then multiplexed.

Orthogonal signals can be separated at the receiver by using correlation techniques, eliminating inter-symbol interference. This can be achieved by carefully selecting carrier spacing so as to let the carrier spacing equal the reciprocal of the useful symbol period. Orthogonal Frequency Division Multiplexing (OFDM) is a form of multicarrier modulation wherein carrier spacing is selected so that each subcarrier is orthogonal to the other subcarriers.

This orthogonality avoids adjacent channel interference and prevents the demodulators from seeing frequencies other than their own. The benefits of OFDM are high spectral efficiency, resiliency to Radio Frequency (RF) interference, and lower multi-path distortion.

In OFDM the subcarrier pulse used for transmission is chosen to be rectangular. This has the advantage that the task of pulse forming and modulation can be performed by a simple Inverse Discrete Fourier Transform (IDFT) which can be implemented very efficiently as an Inverse Fast Fourier Transform (IFFT). Therefore, the receiver only needs a FFT to reverse this operation.

Incoming serial data is first converted from serial to parallel and grouped into x bits each to form a complex number. The number x determines the signal constellation of the corresponding subcarrier, such as 16 Quadrature Amplitude Modulation. The complex number are modulated in a baseband fashion by the IFFT and converted back to serial data for transmission. A guard symbol is inserted between symbols to avoid inter-symbol interference (ISI) caused by multi-path distortion. The discrete symbols are converted to analog and low-pass filtered for RF up-conversion. The receiver then simply performs the inverse process of the transmitter.

According to the theorems of the Fourier Transform the rectangular pulse shape will lead to a sin(x)/x type of spectrum of the subcarriers, as illustrated in FIG. 1. The spectrums of the subcarriers are not separated but overlap. The reason why the information transmitted over the carriers can be separated is the orthogonality relation. By using an IFFT for modulation, the spacing of the subcarriers is chosen such that at the frequency where a received signal is evaluated (indicated by letters A-E in FIG. 1) all other signals are zero.

The seminal article on OFDM is "Data Transmission by Frequency-Division Multiplexing Using the Discrete Fourier Transform", by S. B. Weinstein and Paul M. Ebert in *IEEE Transactions on Communication Technology*, Vol. com-19, No. 5, October 1971, the contents of which are hereby incorporated by reference.

OFDM forms the basis for the Digital Audio Broadcasting (DAB) standard in the European market as well as the basis for the global Asymmetric Digital Subscriber Line (ADSL) standard. Development is ongoing for wireless point-to-point and point-to-multipoint configurations for Wireless Local Area Networks using OFDM technology. In a supplement to the IEEE 802.11 standard, the IEEE 802.11 working group published IEEE 802.11a, which outlines the use of OFDM in the 5.8-GHz band.

A packet communication system, similar to other types of communication systems, provides for the communication of data between communication stations within a set of communication stations. The set includes at least a sending station and a receiving station. Data originated at, or otherwise provided to, a sending station is caused to be communicated by the sending station for delivery at a receiving station. The data sent by the sending station is sent upon a communication channel, and the receiving station monitors the communication channel, thereby to detect delivery of the data communicated thereon.

In a packet communication system, data that is communicated is first packetized into packets of data, and the data packets, once formed, are then communicated, sometimes at discrete intervals. Once delivered to a receiving station, the information content of the data is ascertained by concatenating the information parts of the packets together. Packet communication systems generally make efficient use of communication channels as the communication channels need only to be allocated pursuant to a particular communication session only for the period during which the data packets are communicated. Packet communication channels are sometimes, therefore, shared communication channels that are shared by separate sets of communication stations between which separate communication services are concurrently effectuated.

Operating specifications that define the operating protocols of various types of packet radio communication systems have been promulgated and yet others are undergoing development and standardization. A packet radio communication system provides the advantages of a radio communication system in that the communication stations that are parties to a communication session need not be interconnected by electrically-conductive connectors. Instead, the communication channels of a packet radio communication system are formed of radio channels, defined upon a portion of the electromagnetic spectrum.

While packet radio communication systems have been developed for the effectuation of various different types of communication services, much recent interest has been directed towards the development of packet radio communication systems capable of providing data-intensive communication services. For instance, the IEEE 802.15.3a operating specification contemplates an OFDM Ultra Wide Band (UWB) communication system, capable of communicating data over wide bandwidths over short ranges.

A structured data format is set forth in the present promulgation of the operating specification. The data format of a data packet formed in conformity with the IEEE 802.15.3a includes a preamble part and a payload part. Other packet communication systems analogously format data into packets that also include a preamble part and a payload part. The payload part of the packet contains the information that is to be communicated. That is to say, the payload part is nondeterminative. Conversely, the preamble part of the data packet does not contain the informational content that is to be communicated but, rather, includes determinative data that is used for other purposes. In particular, the preamble part of an IEEE 802.15.3a packet preamble includes three parts, a packet sync sequence, a frame sync sequence, and a channel estimation sequence. The packet sync sequence is of a length of twenty-one OFDM (symbols), the frame sync sequence is of a length of three OFDM symbols, and the channel estimation sequence is of a length of six OFDM symbols. Collectively, the sequences are of a time length of 9,375 microseconds.

The preamble portions are used, for instance, to facilitate synchronization between the sending and receiving stations that send and receive the data packet, respectively. Additionally, the preamble is used for purposes of automatic gain control (AGC). For use of automatic gain control, a receiving station is able to set its gain at an appropriate level, e.g., to facilitate application of received data to an analog-to-digital converter to supply useful bits to a baseband part of the receiving station.

The preamble is further used for purposes of packet detection. Packet detection identifies to the receiving station the reception at the receiving station of the packet. Upon detection of the packet, e.g., various state machines at the receiving station are started to enable processing of the incoming packet.

Of particular significance, the preamble also is used for channel estimation. The radio channel upon which the packet is communicated undergoes reflections and is otherwise distorted during its communication to the receiving station. To receive the transmitted data correctly, the receiving station must be provided with a good estimate of the channel to permit proper compensation to be made of the channel. The channel estimation sequence is a known wave form that tells the receiver what the channel looks like. From this known wave form, the receiver can properly extrapolate unknown sequences.

The PAR is the ratio of the instantaneous peak value (maximum magnitude) of a signal parameter to its time-averaged value. Unfortunately, high PAR signals tend to increase the resolution requirements of receive and transmit converters to reduce clipping, which in turn increases power consumption and cost. Lowering the PAR allows for lower power consumption and fewer bits in Analog-to-Digital (A/D) and Digital-to-Analog (D/A) converters.

During the channel estimation sequence, the multipath channel response is estimated. While clipping in the packet synchronization, frame synchronization or data portion of the packet can be tolerated to an extent, it is very important to avoid clipping the channel estimation sequence. Errors in the channel estimation sequence have a forward propagation effect because the channel estimate is used to decode all the data following the channel estimation sequence. This forward propagation effect raises the noise floor on all data, decreasing the probability of a successful packet transfer.

Unfortunately, OFDM signal tends to have a high PAR. For sequences such as channel estimation sequences, it is desirable to find sequences that yield low PAR. To lower the probability of clipping the channel estimation sequence, a deterministic training sequence is used. It is desirable to find sequences with very low PAR that are well below the average of random sequences. However, the space of all sequences is too large to search. In the multiband specification, the training sequence is of length 122 bits. There are $4^{122}$ possible quadrature-phase-shift-keyed (QPSK) sequences of this length. Thus it is clear that an exhaustive search to find the lowest PAR sequence is practically impossible.

The search for low PAR sequences has historically been performed by random search. Since the space of all sequences is very large, the whole space cannot be searched. Thus the best sequence is typically not found.

Therefore, it would be desirable to have a method for identifying the best low PAR sequences without randomly searching the whole space of sequences.

SUMMARY OF THE INVENTION

The present invention provides a method for selecting channel estimation sequences with low Peak to Average Ratios (PAR) for Orthogonal Frequency Division Multiplexing (OFDM) signals. The method involves selecting a channel estimation sequence and random and then searching all sequences within a defined neighborhood (distance) of that sequence. If any of the sequences in the neighborhood have a PAR lower than the seed sequence, that new neighborhood sequence becomes the new seed, and the algorithm now searches all sequences within a defined distance of the new seed to determine if any of them have a lower PAR. This process is repeated until the process converges on the sequence with the lowest PAR.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 1:
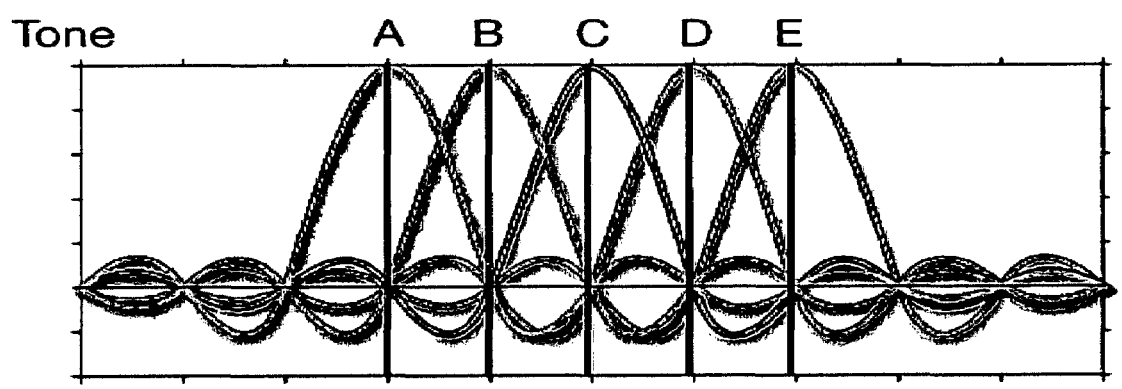
FIG. 1 shows an OFDM signal.
Figure 2:
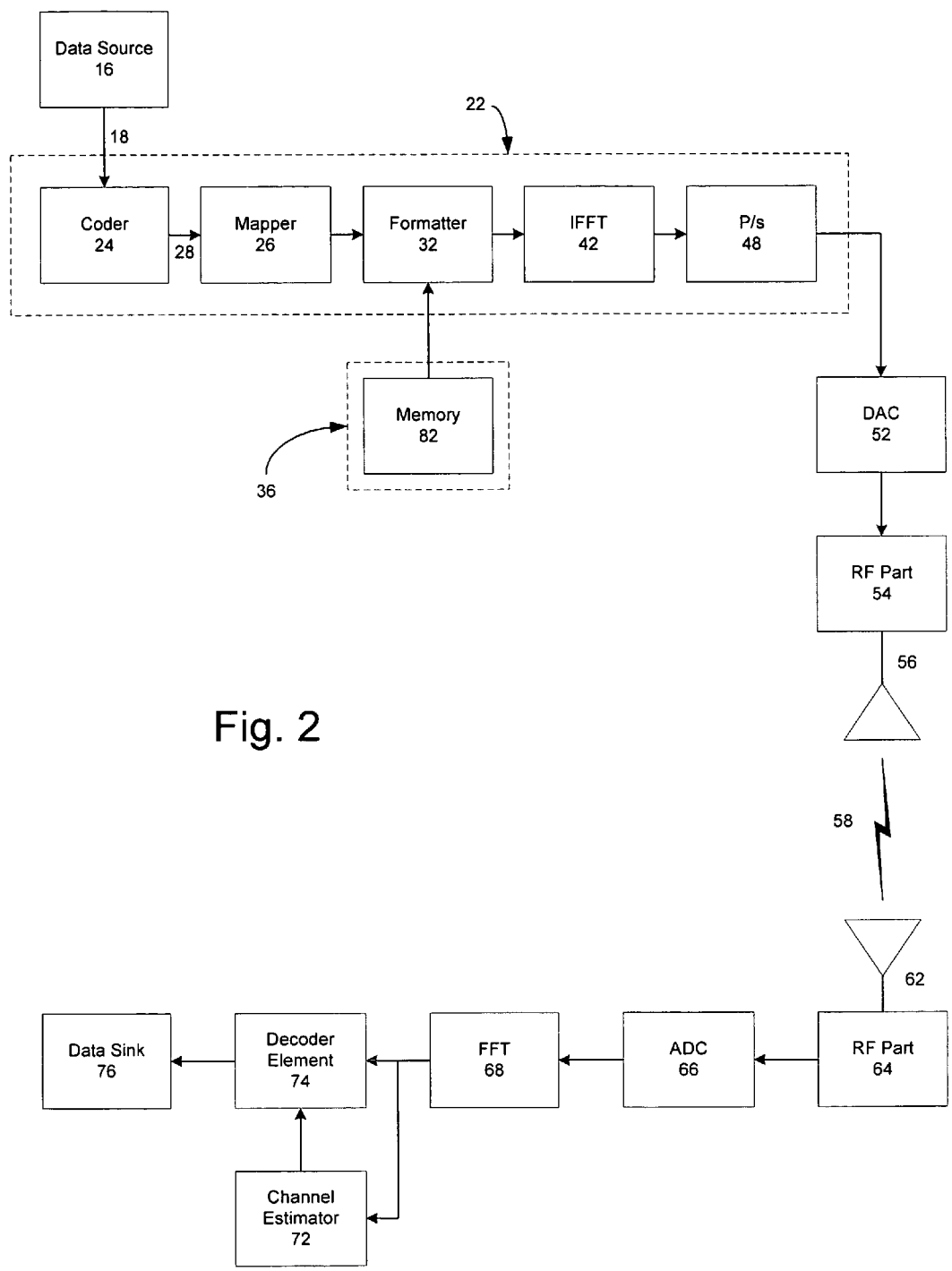
FIG. 2 shows a communication system in which the present invention may be implemented.

FIG. 2 shows a block diagram of a communication system in which the present invention may be implemented. While the communication system is representative of any of various packet, and other, radio communication systems, in the exemplary embodiment, the communication systems forms an ultra wide band (UWB) OFDM (Orthogonal Frequency Division Multiplexing) communication system that provides for high data rate communications over short distances. The communication system is operable in general conformity with a variant of an IEEE 802 operating specification that pertains to UWB OFDM communications, such as the IEEE 802.15.3a operating specification.

Additionally, while operation of an embodiment of the present invention has particular applicability to communications in such an UWB OFDM communication system that operates in conformity with the IEEE 802.15.3a operating specification, or a variant thereof, an embodiment of the present invention also has applicability in other types of communication systems in which deterministic sequences are used. Accordingly, the following description is exemplary only, and the teachings of the present invention can analogously be described with respect to communications in another type of communication system.

Data sent by the sending station is originated at a data source 16. The data source 16 is representative of a data source embodied physically together with other structure of the sending station as well as a data source that is positioned remote from the other structure of the sending station. The data source generates digital bits on the line 18 that is provided to a coding element 22. The coding element 22 includes functional entities, implementable in any desired manner, such as by ASIC implementation or by algorithms executable by processing circuitry.

The coding element 22 depicted in the present example includes a coder 24, such as a convolutional coder that forms coded representations of the input data bits provided to the coding element. The coded representations, in one embodiment, are further punctured by a puncturing pattern. The coded data is provided to a mapper 26 that maps code words formed by the coder 24 on the lines 28 into data symbols, e.g., QPSK (Quarternary Phase Shift Keying) symbols, 16-QAM symbols, etc. Mapped symbols are formatted by a formatter 32.

The formatter 32 forms data structures that are in conformity with the IEEE 802.15.3a operating specification. As set forth in the operating specification, the data structure forms a packet including a preamble and a payload. Values that populate part of the preamble are formed by the apparatus 36, provided to the formatter 32 by way of the line 38.

Data structures, once formed by the formatter 32, are placed in the time domain by an inverse fast Fourier transformer (IFFT) 42. And, once transformed, the values are placed in serial form by a parallel-to-serial (P/S) converter 48.

Time-domain representations are provided, serially, to a digital-to-analog converter (DAC) 52. The converter converts the data into analog form. And, once converted, the data is provided to an RF (Radio Frequency) part 54 that performs RF operations, such as up-conversion and modulation operations upon the data. The data, once operated upon, is provided to one or more transmit antennas 56. While a single transmit antenna 56 is shown, in a multiple input system, multiple transmit antennas are used, and the antenna 56 is representative of any number of transmit antennas.

The data sent by the sending station is sent upon radio channels of a radio air interface defined in the IEEE 802.15.3a operating specification. As the IEEE 802.15.3a operating specification defines channels upon sub-carriers, the sending station causes the data to be communicated on the different sub-carriers, e.g., 128 sub-carriers that are defined on the radio air interface. The transmission symbol 58 is representative of the sub-carriers upon which the data is communicated by the sending station to the receiving station.

The receiving station includes one or more receive antennas 62. Again, while only a single receive antenna is shown, in an actual implementation, additional receive antennas can be utilized. The receive data, once converted into electrical form by the receive antenna is provided to an RF part 64, which operates in manners analogous to operation of the RF part 54 of the sending station. However, at the receiving station the RF part 54 operates to demodulate and down-convert the received data.

The received data, once down-converted to baseband levels by the RF part 64, is digitized by an analog-to-digital converted (ADC) 66. The data, once digitized, is transformed into the frequency domain by a fast Fourier transformer (FFT) 68. The data, once transformed, is operated upon, here by a channel estimator 72 and by a decoding element 74. Various functions are performed by the decoding element 74. While not separately shown, mapping and decoding operations, amongst other things, are performed by the decoding element. Operations performed by the decoder element make use of channel estimation made by the channel estimator 72.

As mentioned previously, the formatting is performed at the sending station to form a data structure including a preamble and a payload. The preamble includes a channel estimation sequence that is used by the channel estimator 72 to estimate the channel and to facilitate better operation of the decoder element of the receiving station. Here, the apparatus 36 includes a memory element 82 that stores one or more deterministic sequences used as a channel estimation sequence that populates part of the preamble of a data structure formed by the formatter 32. When a data structure is formed, the sequence is retrieved from the memory element and used to populate the appropriate portion of the preamble of the data structure. When more than one sequence is stored, the apparatus further includes a selector for selecting which sequence to utilize. The sequence is of a peak-to-average ratio (PAR) of lower than 8.86 dB. Because of the lowered peak-to-average ratio, the possibility of clipping of the sequence by circuitry of the communication stations, such as the converters 52 and 56, is reduced.

Choosing a channel estimation sequence with a low PAR is important to avoid clipping of the sequence caused by too high a peak. Errors in the channel estimation sequence caused by clipping have a forward propagation effect because the channel estimate is used to decode all the data following the channel estimation sequence. This forward propagation effect raises the noise floor on all data, decreasing the probability of a successful packet transfer.

For example, consider an OFDM wherein an input sequence is presented at the input to an Inverse Fast Fourier Transform (IFFT). Without loss of generality, assume an IFFT with 128 inputs of which 122 have energy on them. With these assumptions, the PAR of the OFDM symbol may be calculated (using Matlab code) as:

```
Function PAR = findPAR (a, k)
    b = [0 a(62:122) zeros(1,5) a(1:61)];
    k = 10;
    N = 2^(k + log2(length (aa)));
    d = [c(1:64) zeros(1,N – 128) c(65:128)];
    p + ifft(d);
    E = p*p'/N;
    PAR = 10*log10(max (abs(p).^2)/E);
Return;
```

Where k is the oversampling factor. Using a large k increases the accuracy but it also increase the complexity of the computation.

Figure 3:
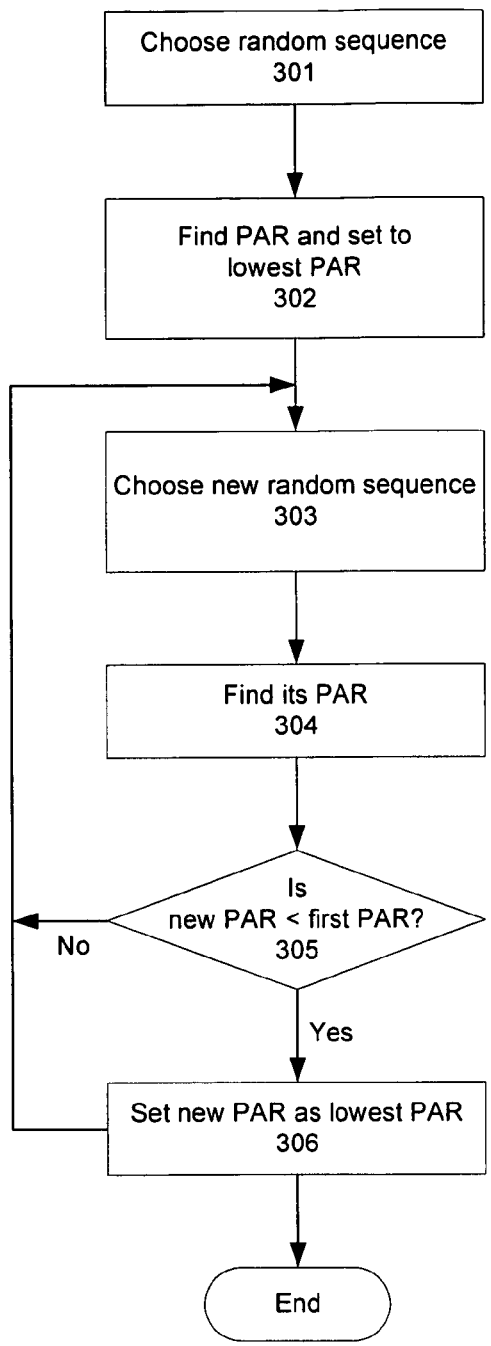
FIG. 3 is a flowchart illustrating the prior art method of randomly searching for low PAR sequences.

Historically, low PAR sequences were found by searching randomly. FIG. 3 is a flowchart illustrating the prior art method of randomly searching for low PAR sequences. The process begins by simply choosing a channel estimation sequence at random (step 301). The system then finds the PAR of this random sequence and is set as the lowest PAR (step 302).

The system then chooses another random sequence (step 303) and determines its PAR (Step 304). The PAR of the second chosen sequence is compared to the first PAR (step 305). If the new PAR is not lower than the first PAR, the process returns to step 303 and selects another sequence at random.

If the new PAR found in step 304 is lower that the first PAR, the new PAR becomes the lowest PAR (step 306), and the process returns to step 303 and selects another sequence at random.

The process continues for a specified number of cycles or a specified amount of time.

The following is an example of implementing the process flow of FIG. 3 using Matlab:

```
bestSeq = [];
bestPAR = inf;
k = 10;
while loop = 1:1e6,
    a = 2*rand([1 122]) – 1;
    curPAR = findPAR (a, k);
    if curPAR < bestPAR
        bestSeq = a;
        bestPAR = curPAR;
    end
end
```

Figure 4:
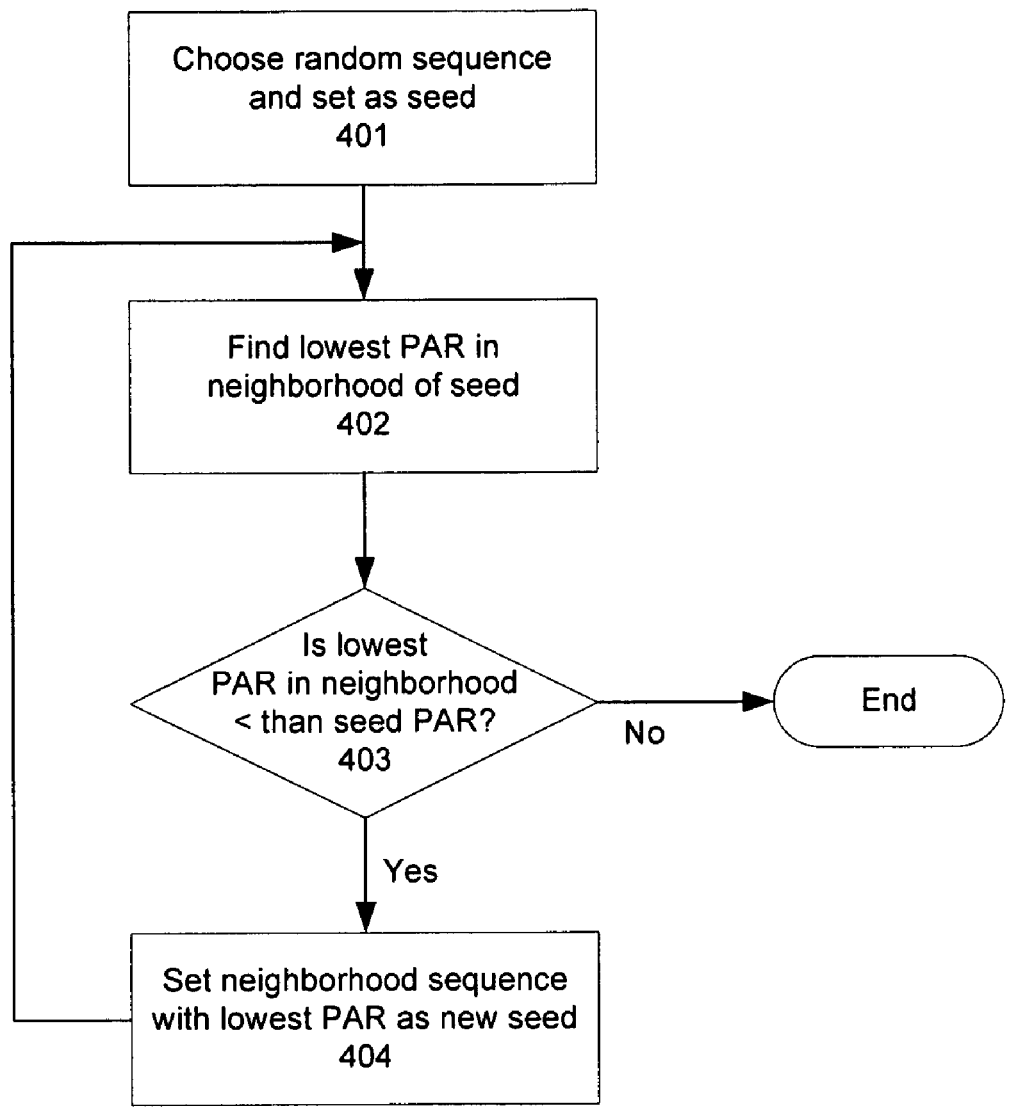
FIG. 4 is a flowchart illustrating the recursive algorithm of the present invention.

FIG. 4 is a flowchart illustrating the recursive algorithm of the present invention. The algorithm of the present invention uses a recursive method to find increasingly better sequences, i.e. those sequences with a lower PAR. The algorithm begins by choosing a sequence at random and then sets that sequence as a "seed" (step 401). The algorithm then searches a "neighborhood" around the seed sequence and finds the sequence within the neighborhood that has the lowest PAR (step 402). A neighborhood is defined as a distance function between two sequences. A simple understanding of the distance function would be the number of places in the sequence that are different from the seed sequence. The algorithm searches over all sequences within that distance from the given seed sequence.

The algorithm compares the lowest PAR in the neighborhood with the PAR of the seed sequence (step 403). If the lowest PAR in the neighborhood is not lower than the PAR of the seed sequence, the seed sequence is chosen as the channel estimation sequence, and the algorithm ends.

If the new PAR is lower than the original seed PAR, that neighborhood sequence is set as the new seed (step 404), and the algorithm returns to step 402 and searches the neighborhood around the new seed sequence. The distance used to define the neighborhood remains unchanged from the original seed sequence.

This process continues until it converges on the sequence with the lowest PAR.

A possible modification of the search algorithm of the present invention is to recursively search not only around the sequence in the neighborhood with the lowest PAR but around the N best sequences in the neighborhood. For example, if N=3 and the three lowest PAR values in the neighborhood are 4.25 dB, 4.26 dB, and 4.28 dB, the algorithm will search around all three sequences instead of just the lowest one (4.25 dB).

By searching around the N best sequences, the algorithm can determine which of the sequences is actually the best with respect to some criterion. When searching the N best sequences in the neighborhood, a criterion may be used to prevent the search from not converging, e.g., by never searching a seed that is more than L dB than the known best sequence. For example, assuming the PAR values above, if L=0.03 dB, the algorithm will not search any sequence with a PAR higher than 4.28 dB.

The following is an example of implementing the process flow of FIG. 4 using Matlab:

```
bestSeq = [];
bestPAR = inf;
lastPAR = inf;
cursed = seed;
FirstPass = 1;
while ((bestPAR < lastPAR) | FirstPass)
    FirstPass = 0;
    lastPAR = bestPAR;
    [Seq bestPAR] = LowestInNeighborhood (cursed);
    cursed = Seq;
end;
bestSeq = Seq
return;
```

The function LowestInNeighborhood( ) is a key part of the algorithm. This function searches a neighborhood around the seed sequence, wherein the neighborhood is defined as all sequences within a specific distance from the seed sequence. As an example, consider sequences x and y from $\{+1, -1\}^{122}$. A neighborhood is defined by taking a distance function, d( ), and searching all sequences inside that distance, e.g., all y such that d(x,y)>4.

A distance function can be as simple as the number of places that are different in the sequence. The following example function searches just over conjugate symmetric sequences with the input sequence over $\{+1, -1\}$ or $\{+j, -j\}$:

```
function [b bestRotPAR] = LowestInNeighborhood (a)
rot = exp(j*2*pi/4. *[2]);
bestRotPAR = inf;
%% Distance of 1
for loopA = 1:61,
    for loopB = 1:1,
        b = a;
        b(loopA) = b(loopA) * rot(loopB);
        b(123 – loopA) = conj (b(loopA));
        aa = [0 b(62: 122) zeros(1, 5) b(1:61)];
        % IFFT
        k = 2;
        N = 2^(k + log2(length(aa)));
        c = [aa(1:64) zeros(1, N – 128) aa(65:128)];
        p = ifft(c);
        % Average power
        E1 = p*p'/N;
        % Peak to average power
        truePAR = todb(max(abs(p).^2)/E1);
        if truePAR < bestRotPAR
            if findPAR(b, 10) < bestRotPAR
                bestRotPAR = findPAR(b, 10);
                b.'
                disp(['Best PAR = ' num2str(bestRotPAR)])
                disp(' ')
                eval(['save Neg_CS_' num2str(bestRotPAR)])
            end
        end
    end
end
%% Test distance 2
for loopA = 1:61,
    for loopAr = 1:1,
        for loopB = 1:61,
```

```
            for loopBr = 1:1,
         b = a;
         b(loopA) = b(loopA) * rot(loopAr);
         b(123 − loopA) = conj(b(loopA));
         b(loopB) = b(loopB) * rot(loopBr);
         b(123 − loopB) = conj(b(loopB));
         aa = [0 b(62: 122) zeros(1, 5) b(1: 61)];
         % IFFT
         k = 2;
         N = 2^(k + log2(length(aa)));
         c = [aa(1:64) zeros(1, N − 128) aa(65:128)];
         p = ifft(c);
         % Average power
         E1 = p*p'/N;
         % Peak to average power
         truePAR = todb(max(abs(p).^2)/E1);
            if truePAR < bestRotPAR
               if findPAR(b, 10) < bestRotPAR
                  bestRotPAR = findPAR(b, 10);
                  b.'
                  disp(['Best PAR = ' num2str(bestRotPAR)])
                  disp(' ')
                  eval(['save Neg_CS_' num2str(bestRotPAR)])
               end
            end
         end
      end
   end
end
%% Test distance 3
for loopA = 1:61,
   for loopAr = 1:1,
      for loopB = 1:61,
         for loopBr = 1:1,
            for loopC = 1:61,
               for loopCr = 1:1,
      b = a;
      b(loopA) = b(loopA) * rot(loopAr);
      b(123 − loopA) = conj(b(loopA));
      b(loopB) = b(loopB) * rot(loopBr);
      b(123 − loopB) = conj(b(loopB));
      b(loopC) = b(loopC) * rot(loopCr);
      b(123 − loopC) = conj(b(loopC));
      aa = [0 b(62: 122) zeros(1, 5) b(1: 61)];
      % IFFT
      k = 2;
      N = 2^(k + log2(length(aa)));
      c = [aa(1:64) zeros(1, N − 128) aa(65:128)];
      p = ifft(c);
      % Average power
      E1 = p*p'/N;
      % Peak to average power
      truePAR = todb(max(abs(p).^2)/E1);
         if truePAR < bestRotPAR
            if findPAR(b, 10) < bestRotPAR
               bestRotPAR = findPAR(b, 10);
               b.'
               disp(['Best PAR = ' num2str(bestRotPAR)])
               disp(' ')
               eval(['save Neg_CS_' num2str(bestRotPAR)])
            end
         end
               end
            end
         end
      end
   end
end
%% Test distance 4
for loopA = 1:61,
   disp(['loopA = ' num2str(loopA)])
   for loopAr = 1:1,
      for loopB = 1:61,
         for loopBr = 1:1,
            for loopC = 1:61,
               for loopCr = 1:1,
                  for loopD = 1:61,
                     for loopDr = 1:1,
      b = a;
      b(loopA) = b(loopA) * rot(loopAr);
      b(123 − loopA) = conj(b(loopA));
      b(loopB) = b(loopB) * rot(loopBr);
      b(123 − loopB) = conj(b(loopB));
      b(loopC) = b(loopC) * rot(loopCr);
      b(123 − loopC) = conj(b(loopC));
      b(loopD) = b(loopD) * rot(loopDr);
      b(123 − loopD) = conj(b(loopD));
      aa = [0 b(62: 122) zeros(1, 5) b(1: 61)];
      % IFFT
      k = 2;
      N = 2^(k + log2(length(aa)));
      c = [aa(1:64)zeros(1, N − 128)aa(65:128)];
      p = ifft(c);
      % Average power
      E1 = p*p'/N;
      % Peak to average power
      truePAR = todb(max(abs(p).^2)/E1);
         if truePAR < bestRotPAR
            if findPAR(b, 10) < bestRotPAR
               bestRotPAR = findPAR(b, 10);
               b.'
               disp(['Best PAR = ' num2str(bestRotPAR)])
               disp(' ')
               eval(['save Neg_CS_' num2str(bestRotPAR)])
            end
         end
                     end
                  end
               end
            end
         end
      end
   end
end
return
```

The following sequence is an alternate example that also searches over conjugate symmetric sequences, but in this case searches over Quarternary Phase-Shift Keying (QPSK) inputs. QPSK is a digital frequency modulation technique used for sending data over coaxial cable. QPSK is used primarily for sending data from cable subscribers upstream to the Internet.

```
function [b bestRotPAR] = BestInNeighborhood (a)
rot = exp(j*2*pi/4. *[1 2 3]);
bestRotPAR = inf;
%% Distance of 1
for loopA = 1:61,
   for loopB = 1:3,
      b = a;
      b(loopA) = b(loopA) * rot(loopB);
      b(123 − loopA) = conj (b(loopA));
      aa = [0 b(62: 122) zeros(1, 5) b(1:61)];
      % IFFT
      k = 2;
      N = 2^(k + log2(length(aa)));
      c = [aa(1:64) zeros(1, N − 128) aa(65:128)];
      p = ifft(c);
      % Average power
      E1 = p*p'/N;
      % Peak to average power
      truePAR = todb(max(abs(p).^2)/E1);
         if truePAR < bestRotPAR
            if findPAR(b, 10) < bestRotPAR
               bestRotPAR = findPAR(b, 10);
               b.'
               disp(['Best PAR = ' num2str(bestRotPAR)])
               disp(' ')
               eval(['save QPSK_' num2str(bestRotPAR)])
            end
         end
   end
end
```

```
end
%%% Test distance 2
for loopA = 1:61,
    for loopAr = 1:3,
        for loopB = 1:61,
            for loopBr = 1:3,
                b = a;
                b(loopA) = b(loopA) * rot(loopAr);
                b(123 - loopA) = conj(b(loopA));
                b(loopB) = b(loopB) * rot(loopBr);
                b(123 - loopB) = conj(b(loopB));
                aa = [0 b(62: 122) zeros(1, 5) b(1: 61)];
                % IFFT
                k = 2;
                N = 2^(k + log2(length(aa)));
                c = [aa(1:64) zeros(1, N - 128) aa(65:128)];
                p = ifft(c);
                % Average power
                E1 = p*p'/N;
                % Peak to average power
                truePAR = todb(max(abs(p).^2)/E1);
                if truePAR < bestRotPAR
                    if findPAR(b, 10) < bestRotPAR
                        bestRotPAR = findPAR(b, 10);
                        b.'
                        disp(['Best PAR = ' num2str(bestRotPAR)])
                        disp(' ')
                        eval(['save QPSK_' num2str(bestRotPAR)])
                    end
                end
            end
        end
    end
end
%%% Test distance 3
for loopA = 1:61,
    for loopAr = 1:3,
        for loopB = 1:61,
            for loopBr = 1:3,
                for loopC = 1:61,
                    for loopCr = 1:3,
                        b = a;
                        b(loopA) = b(loopA) * rot(loopAr);
                        b(123 - loopA) = conj(b(loopA));
                        b(loopB) = b(loopB) * rot(loopBr);
                        b(123 - loopB) = conj(b(loopB));
                        b(loopC) = b(loopC) * rot(loopCr);
                        b(123 - loopC) = conj(b(loopC));
                        aa = [0 b(62: 122) zeros(1, 5) b(1: 61)];
                        % IFFT
                        k = 2;
                        N = 2^(k + log2(length(aa)));
                        c = [aa(1:64) zeros(1, N - 128) aa(65:128)];
                        p = ifft(c);
                        % Average power
                        E1 = p*p'/N;
                        % Peak to average power
                        truePAR = todb(max(abs(p).^2)/E1);
                        if truePAR < bestRotPAR
                            if findPAR(b, 10) < bestRotPAR
                                bestRotPAR = findPAR(b, 10);
                                b.'
                                disp(['Best PAR = ' num2str(bestRotPAR)])
                                disp(' ')
                                eval(['save QPSK_' num2str(bestRotPAR)])
                            end
                        end
                    end
                end
            end
        end
    end
end
%%% Test distance 4
for loopA = 1:61,
    disp(['loopA = ' num2str(loopA)])
    for loopAr = 1:3,
        for loopB = 1:61,
            for loopBr = 1:3,
                for loopC = 1:61,
                    for loopCr = 1:3,
                        for loopD = 1:61,
                            for loopDr = 1:1,
                                b = a;
                                b(loopA) = b(loopA) * rot(loopAr);
                                b(123 - loopA) = conj(b(loopA));
                                b(loopB) = b(loopB) * rot(loopBr);
                                b(123 - loopB) = conj(b(loopB));
                                b(loopC) = b(loopC) * rot(loopCr);
                                b(123 - loopC) = conj(b(loopC));
                                b(loopD) = b(loopD) * rot(loopDr);
                                b(123 - loopD) = conj(b(loopD));
                                aa = [0 b(62: 122) zeros(1, 5) b(1: 61)];
                                % IFFT
                                k = 2;
                                N = 2^(k + log2(length(aa)));
                                c = [aa(1:64) zeros(1, N - 128) aa(65:128)];
                                p = ifft(c);
                                % Average power
                                E1 = p*p'/N;
                                % Peak to average power
                                truePAR = todb(max(abs(p).^2)/E1);
                                if truePAR < bestRotPAR
                                    if findPAR(b, 10) < bestRotPAR
                                        bestRotPAR = findPAR(b, 10);
                                        b.'
                                        disp(['Best PAR = ' num2str(bestRotPAR)])
                                        disp(' ')
                                        eval(['save QPSK_' num2str(bestRotPAR)])
                                    end
                                end
                            end
                        end
                    end
                end
            end
        end
    end
end
return
```

A key to the function above is the ability to rotate each modified point through the PQSK constellation. The neighborhood function may also be modified to search over non-conjugate symmetric sequences by removing the conjugation and allowing the sequence to be changed in any position rather than just the first half.

The present invention covers all sequences that are terminal sequences in this recursion. This is a very sparse space of sequences. More specifically, the invention covers all terminal sequences of the algorithm over the space of 128-point IFFTs with 122 tone input, as shown in the above example. For both conjugate and non-conjugate symmetric sequences, the terminal sequences covered by the present invention include QPSK, {+1, −1}, and {+j, −j}.

The following example sequence found with the algorithm of the present invention is a conjugate symmetric sequence over ±j with PAR of 4.8163 dB:

CS_PMj_4_8163=

Columns 1 through 5
    0+1.0000i 0−1.0000i 0−1.0000i 0−1.0000i 0+1.0000i

Columns 6 through 10
    0+1.0000i 0+1.0000i 0+1.0000i 0+1.0000i 0−1.0000i

Columns 11 through 15
    0−1.0000i 0−1.0000i 0+1.0000i 0−1.0000i 0−1.0000i

Columns 16 through 20
    0−1.0000i 0+1.0000i 0−1.0000i 0+1.0000i 0−1.0000i

Columns 21 through 25
0−1.0000i 0+1.0000i 0+1.0000i 0+1.0000i 0+1.0000i

Columns 26 through 30
0−1.0000i 0−1.0000i 0+1.0000i 0−1.0000i 0−1.0000i

Columns 31 through 35
0−1.0000i 0−1.0000i 0−1.0000i 0−1.0000i 0+1.0000i

Columns 36 through 40
0−1.0000i 0+1.0000i 0+1.0000i 0−1.0000i 0+1.0000i

Columns 41 through 45
0−1.0000i 0−1.0000i 0+1.0000i 0+1.0000i 0+1.0000i

Columns 46 through 50
0−1.0000i 0+1.0000i 0+1.0000i 0+1.0000i 0+1.0000i

Columns 51 through 55
0−1.0000i 0+1.0000i 0−1.0000i 0+1.0000i 0−1.0000i

Columns 56 through 60
0−1.0000i 0+1.0000i 0+1.0000i 0−1.0000i 0+1.0000i

Columns 61 through 65
0+1.0000i 0−1.0000i 0−1.0000i 0+1.0000i 0−1.0000i

Columns 66 through 70
0−1.0000i 0+1.0000i 0+1.0000i 0−1.0000i 0+1.0000i

Columns 71 through 75
0−1.0000i 0+1.0000i 0−1.0000i 0−1.0000i 0−1.0000i

Columns 76 through 80
0−1.0000i 0+1.0000i 0−1.0000i 0−1.0000i 0−1.0000i

Columns 81 through 85
0+1.0000i 0+1.0000i 0−1.0000i 0+1.0000i 0−1.0000i

Columns 86 through 90
0−1.0000i 0+1.0000i 0−1.0000i 0+1.0000i 0+1.0000i

Columns 91 through 95
0+1.0000i 0+1.0000i 0+1.0000i 0+1.0000i 0−1.0000i

Columns 96 through 100
0+1.0000i 0+1.0000i 0−1.0000i 0−1.0000i 0−1.0000i

Columns 101 through 105
0−1.0000i 0+1.0000i 0+1.0000i 0−1.0000i 0+1.0000i

Columns 106 through 110
0−1.0000i 0+1.0000i 0+1.0000i 0+1.0000i 0−1.0000i

Columns 111 through 115
0+1.0000i 0+1.0000i 0+1.0000i 0−1.0000i 0−1.0000i

Columns 116 through 120
0−1.0000i 0−1.0000i 0−1.0000i 0+1.0000i 0+1.0000i

Columns 121 through 122
0+1.0000i 0−1.0000i

The following example sequence found with the algorithm of the present invention is a conjugate symmetric sequence over QPSK with PAR of 5.2712 dB:

CS_QPSK_5_2712=

Columns 1 through 5
1.0000−1.0000i  1.0000−1.0000i  −1.0000+1.0000i  1.0000−1.0000i 1.0000+1.0000i Columns 6 through 10
1.0000−1.0000i  −1.0000−1.0000i  1.0000−1.0000i  1.0000−1.0000i 1.0000−1.0000i Columns 11 through 15
−1.0000+1.0000i  1.0000−1.0000i  1.0000−1.0000i  −1.0000+1.0000i 1.0000−1.0000i Columns 16 through 20
1.0000−1.0000i  −1.0000+1.0000i  −1.0000−1.0000i  −1.0000+1.0000i 1.0000−1.0000i Columns 21 through 25
−1.0000+1.0000i  −1.0000+1.0000i  −1.0000+1.0000i  −1.0000+1.0000i 1.0000−1.0000i Columns 26 through 30
−1.0000+1.0000i  1.0000−1.0000i  −1.0000+1.0000i  −1.0000+1.0000i 1.0000−1.0000i Columns 31 through 35
1.0000−1.0000i  1.0000−1.0000i  1.0000−1.0000i  −1.0000+1.0000i −1.0000+1.0000i Columns 36 through 40
1.0000−1.0000i  1.0000−1.0000i  1.0000+1.0000i  −1.0000+1.0000i 1.0000−1.0000i Columns 41 through 45
−1.0000+1.0000i  −1.0000+1.0000i  −1.0000+1.0000i  −1.0000−1.0000i −1.0000+1.0000i Columns 46 through 50
1.0000−1.0000i  1.0000+1.0000i  −1.0000+1.0000i  1.0000−1.0000i 1.0000−1.0000i Columns 51 through 55
1.0000−1.0000i  1.0000−1.0000i  −1.0000−1.0000i  −1.0000+1.0000i −1.0000+1.0000i Columns 56 through 60
−1.0000+1.0000i  −1.0000+1.0000i  −1.0000+1.0000i  1.0000−1.0000i 1.0000−1.0000i Columns 61 through 65
1.0000−1.0000i 1.0000+1.0000i 1.0000+1.0000i 1.0000+1.0000i −1.0000−1.0000i Columns 66 through 70
−1.0000−1.0000i  −1.0000−1.0000i  −1.0000−1.0000i  −1.0000−1.0000i −1.0000+1.0000i Columns 71 through 75
1.0000+1.0000i 1.0000+1.0000i 1.0000+1.0000i 1.0000+1.0000i −1.0000−1.0000i Columns 76 through 80
1.0000−1.0000i  1.0000+1.0000i  −1.0000−1.0000i  −1.0000+1.0000i −1.0000−1.0000i Columns 81 through 85
−1.0000−1.0000i  −1.0000−1.0000i  1.0000+1.0000i  −1.0000−1.0000i 1.0000−1.0000i Columns 86 through 90
1.0000+1.0000i  1.0000+1.0000i  −1.0000−1.0000i  −1.0000−1.0000i 1.0000+1.0000i Columns 91 through 95
1.0000+1.0000i  1.0000−1.0000i  1.0000+1.0000i  −1.0000−1.0000i −1.0000−1.0000i Columns 96 through 100
1.0000+1.0000i  −1.0000+1.0000i  1.0000+1.0000i  −1.0000−1.0000i −1.0000−1.0000i Columns 101 through 105
−1.0000−1.0000i  −1.0000−1.0000i  1.0000+1.0000i  −1.0000−1.0000i −1.0000+1.0000i Columns 106 through 110
−1.0000−1.0000i  1.0000+1.0000i  1.0000+1.0000i  −1.0000−1.0000i 1.0000+1.0000i Columns 111 through 115
    1.0000+1.0000i  −1.0000−1.0000i  1.0000+1.0000i
    1.0000+1.0000i 1.0000+1.0000i Columns 116 through 120
    −1.0000+1.0000i  1.0000+1.0000i  1.0000−1.0000i
    1.0000+1.0000i −1.0000−1.0000i Columns 121 through 122
    1.0000+1.0000i 1.0000+1.0000i The following example sequence found with the algorithm of the present invention is a non-conjugate symmetric sequence over ±1 with PAR of 3.4369 dB:

NonCS_PM1_3_4369=

Columns 1 through 14
    −1 −1 −1 1 −1 1 1 1 −1 1 1 −1 1 1

Columns 15 through 28
    −1 −1 1 −1 −1 −1 1 −1 1 1 1 −1 −1 −1

Columns 29 through 42
    1 1 1 1 1 1 −1 1 1 1 −1 −1 −1 −1

Columns 43 through 56
    1 −1 −1 1 1 1 1 1 −1 −1 −1 1 −1 1 1

Columns 57 through 70
    −1 1 −1 −1 1 1 −1 1 1 1 1 −1 1 1 1

Columns 71 through 84
    1 −1 1 −1 1 1 1 1 −1 1 1 −1 1 −1

Columns 85 through 98
    −1 −1 −1 −1 1 −1 1 1 −1 −1 −1 −1 1 1 1

Columns 99 through 112
    1 −1 −1 −1 1 −1 −1 −1 −1 1 −1 −1 1 1

Columns 1113 through 122
    1 −1 −1 −1 −1 1 −1 1 −1 −1

Figure 5:
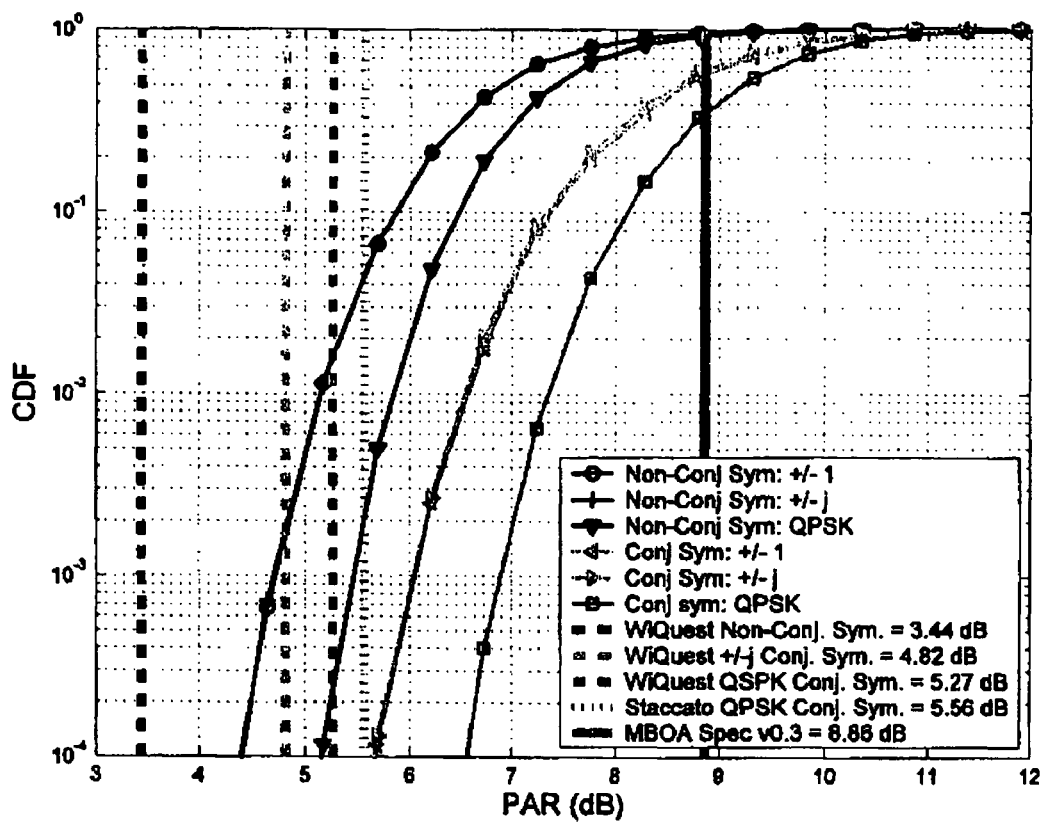
FIG. 5 is a graph showing a variety of sequences found by the recursive algorithm of the present invention versus prior art methods.

FIG. 5 is a graph showing a variety of sequences found by the recursive alogorithm of the present invention versus prior art methods. The sequences found by means of the present invention are labeled "WiQuest". As can be seen in FIG. 5, the sequences found with the present algorithm have significantly lower Par than those found by means of the prior art.

In general, the invention does not deal with the trivial cases of neighborhoods of distance 0 (i.e. the seed sequence only), unless the sequence is the terminal sequence in a recursive search with a distance greater than 0.

Search complexity increases exponentially with the distance of the neighborhood. With the current state of the art in computational equipment, only searches of neigborhoods with a distance of 10 or less are practical. For the examples given herein over a length 122 sequence, searching a neighborhood of distance 4 takes several days in Matlab on a state of the art machine. It should be noted that such neighborhoods are very sparse in the whole space, e.g., $2^4/2^{122}=2^{-118}$. Therefore, advances in computational speed are likely to produce diminishing returns.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A method implemented in an apparatus for selecting a channel estimation sequence, the method comprising the steps of:
    (a) selecting, by the appartus, a first sequence at random from a defined space of all possible sequences;
    (b) defining said first sequence as a seed sequence;
    (c) searching all sequences within a defined distance of the seed sequence;
    (d) finding a second sequence, wherein said second sequence has the lowest peak-to-average ratio (PAR) of all sequences within said defined distance;
    (e) comparing the PAR of the second sequence to the PAR of the seed sequence;
    (f) if the PAR of the second sequence is lower than the PAR of the seed sequence, defining the second sequence as the new seed sequence and repeating steps (c)-(e); and
    (g) if the PAR of said second sequence is higher than the PAR of the seed sequence, selecting the seed sequence as the channel estimation sequence.

2. The method according to claim 1, wherein step (d) further comprises finding N sequences with the N lowest PARs of all sequences in the defined distance, and wherein steps (c)-(e) are repeated for any of the N sequences that has a lower PAR than the seed sequence.

3. The method according to claim 2, wherein steps (c)-(e) are repeated only for any of the N sequences that have a PAR within a range of L dB of the lowest PAR of said N sequences.

4. A computer readable medium for selecting a channel estimation sequence, the computer readable medium encoded with instructions that when executed by a computer are executable to:
    (a) select, by the apparatus, a first sequence at random from a defined space of all possible sequences;
    (b) define said first sequence as a seed sequence;
    (c) search all sequences within a defined distance of the seed sequence;
    (d) find a second sequence, wherein said second sequence has the lowest peak-to-average ratio (PAR) of all sequences within said defined distance;
    (e) compare the PAR of the second sequence to the PAR of the seed sequence;
    (f) if the PAR of the second sequence is lower than the PAR of the seed sequence, define the second sequence as the new seed sequence and repeating steps (c)-(e); and
    (g) if the PAR of said second sequence is higher than the PAR of the seed sequence, select the seed sequence as the channel estimation sequence.

5. The computer readable medium according to claim 4, wherein step (d) further comprises finding N sequences with the N lowest PARs of all sequences in the defined distance, and wherein steps (c)-(e) are repeated for any of the N sequences that has a lower PAR than the seed sequence.

6. The computer readable medium according to claim 5, wherein steps (c)-(e) are repeated only for any of the N sequences that have a PAR within a range of L dB of the lowest PAR of said N sequences.

7. An apparatus for selecting a channel estimation sequence, the apparatus comprising:
    (a) means for selecting a first sequence at random from a defined space of all possible sequences;
    (b) means for defining said first sequence as a seed sequence;

(c) means for searching all sequences within a defined distance of the seed sequence;

(d) means for finding a second sequence, wherein said second sequence has the lowest peak-to-average ratio (PAR) of all sequences within said defined distance;

(e) means for comparing the PAR of the second sequence to the PAR of the seed sequence;

(f) if the PAR of the second sequence is lower than the PAR of the seed sequence, means for defining the second sequence as the new seed sequence and repeating steps (c)-(e); and (g) if the PAR of said second sequence is higher than the PAR of the seed sequence, means for selecting the seed sequence as the channel estimation sequence.

8. The apparatus according to claim 7, wherein means (d) further comprises means for finding N sequences with the N lowest PARs of all sequences in the defined distance, and wherein steps (c)-(e) are repeated for any of the N sequences that has a lower PAR than the seed sequence.

9. The apparatus according to claim 8, wherein steps (c)-(e) are repeated only for any of the N sequences that have a PAR within a range of L dB of the lowest PAR of said N sequences.

10. The method of claim 1, further comprising outputting the selected channel estimation sequence.

11. The method of claim 1, further comprising transforming data based on the selected channel estimation sequence.

12. A system for selecting a channel estimation sequence comprising a channel estimator configured to:
(a) select, in the system, a first sequence at random from a defined space of all possible sequences;
(b) define said first sequence as a seed sequence;
(c) search all sequences within a defined distance of the seed sequence;
(d) find a second sequence, wherein said second sequence has the lowest peak-to-average ratio (PAR) of all sequences within said defined distance;
(e) compare the PAR of the second sequence to the PAR of the seed sequence;
(f) if the PAR of the second sequence is lower than the PAR of the seed sequence, define the second sequence as the new seed sequence and repeating steps (c)-(e); and
(g) if the PAR of said second sequence is higher than the PAR of the seed sequence, select the seed sequence as the channel estimation sequence.

13. The system according to claim 12, wherein the channel estimator is further configured to at step (d) find N sequences with the N lowest PARs of all sequences in the defined distance, and wherein steps (c)-(e) are repeated for any of the N sequences that has a lower PAR than the seed sequence.

14. The system according to claim 13, wherein steps (c)-(e) are repeated only for any of the N sequences that have a PAR within a range of L dB of the lowest PAR of said N sequences.

15. A receiver for selecting a channel estimation sequence comprising:
a receiver antenna configured to receive at least one sequence; and
a channel estimator le configured to:
(a) select a first sequence at random from a defined space of all possible sequences;
(b) define said first sequence as a seed sequence;
(c) search all sequences within a defined distance of the seed sequence;
(d) find a second sequence, wherein said second sequence has the lowest peak-to-average ratio (PAR) of all sequences within said defined distance;
(e) compare the PAR of the second sequence to the PAR of the seed sequence;
(f) if the PAR of the second sequence is lower than the PAR of the seed sequence, define the second sequence as the new seed sequence and repeating steps (c)-(e); and
(g) if the PAR of said second sequence is higher than the PAR of the seed sequence, select the seed sequence as the channel estimation sequence.

16. The receiver according to claim 15, wherein the channel estimator is further configured to at step (d) find N sequences with the N lowest PARs of all sequences in the defined distance, and wherein steps (c)-(e) are repeated for any of the N sequences that has a lower PAR than the seed sequence.

17. The receiver according to claim 16, wherein steps (c)-(e) are repeated only for any of the N sequences that have a PAR within a range of L dB of the lowest PAR of said N sequences.

* * * * *

UNITED STATES PATENT AND TRADEMARK OFFICE
CERTIFICATE OF CORRECTION

PATENT NO.        : 7,593,478 B2
APPLICATION NO.   : 11/114355
DATED             : September 22, 2009
INVENTOR(S)       : Matthew B. Shoemake It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1185 days.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,593,478 B2 | Page 1 of 1 |
| APPLICATION NO. | : 11/114355 | |
| DATED | : September 22, 2009 | |
| INVENTOR(S) | : Shoemake | |

It is certified that error appears in the above-identified patent and that said Letters Patent is hereby corrected as shown below:

Column 16, line 8, claim 1: "appartus" to read as --apparatus--

Column 18, line 5, claim 13: "further configured to at step (d)" to read as --further configured to, at step (d)--

Column 18, line 16, claim 15: "estimator le configured" to read as --estimator configured--

Signed and Sealed this
Tenth Day of May, 2011

David J. Kappos
*Director of the United States Patent and Trademark Office*